(12) United States Patent
Oswald et al.

(10) Patent No.: US 7,250,746 B2
(45) Date of Patent: Jul. 31, 2007

(54) CURRENT MODE SWITCHING REGULATOR WITH PREDETERMINED ON TIME

(75) Inventors: Richard K. Oswald, San Jose, CA (US); Tamotsu Yamamoto, Cupertino, CA (US); Hiroshi Saito, Tokyo (JP); Takuya Ishii, Osaka (JP); Takashi Ryu, Kyoto (JP); Hiroki Akashi, Osaka (JP); Takeshi Tanaka, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/092,814

(22) Filed: Mar. 30, 2005

(65) Prior Publication Data

US 2005/0218877 A1 Oct. 6, 2005

Related U.S. Application Data

(60) Provisional application No. 60/557,695, filed on Mar. 31, 2004.

(51) Int. Cl.
*G05F 1/618* (2006.01)
*G05F 1/575* (2006.01)

(52) U.S. Cl. ..................... 323/284; 323/286
(58) Field of Classification Search ................ 323/220, 323/222–225, 282, 284, 285, 286
See application file for complete search history.

(56) References Cited

U.S. PATENT DOCUMENTS

| | | |
|---|---|---|
| 4,378,530 A | 3/1983 | Garde |
| 4,727,308 A * | 2/1988 | Huljak et al. ................ 323/222 |
| 4,943,902 A | 7/1990 | Severinsky |
| 4,959,606 A | 9/1990 | Forge |
| 5,305,192 A | 4/1994 | Bonte et al. |
| 5,479,090 A | 12/1995 | Schultz |
| 5,600,234 A | 2/1997 | Hastings et al. |
| 5,903,447 A | 5/1999 | Takahashi et al. |
| 5,905,407 A | 5/1999 | Midya |
| 5,929,620 A | 7/1999 | Dobkin et al. |
| 5,949,229 A | 9/1999 | Choi et al. |
| 5,982,160 A | 11/1999 | Walters et al. |
| 6,034,517 A | 3/2000 | Schenkel |
| 6,046,516 A | 4/2000 | Maier et al. |

(Continued)

*Primary Examiner*—Gary L Laxton
(74) *Attorney, Agent, or Firm*—McDermott Will & Emery LLP

(57) ABSTRACT

A power supply switching regulator including a common terminal; an input terminal for supplying a direct current input; an output terminal; a recirculating diode having a first terminal connected to the common terminal; an inductor having a first terminal connected to a second terminal of the recirculation diode and a second terminal connected to the output terminal; a capacitor having a first terminal connected to the output terminal and a second terminal connected to the common terminal; a switch connected between the input terminal and the first terminal of the inductor, the switch operable for switching between an ON state in which the direct current input is coupled to the inductor, and an OFF state in which the direct current input is isolated from the inductor; and a controller coupled to the switch and operable for controlling the amount of time the switch is in the ON state and the OFF state such that the duration of time the switch is in the ON state is inversely proportional to the difference between the voltage at the input terminal and the voltage at the output terminal.

16 Claims, 5 Drawing Sheets

U.S. PATENT DOCUMENTS

| | | |
|---|---|---|
| 6,066,943 A | 5/2000 | Hastings et al. |
| 6,166,528 A | 12/2000 | Rossetti et al. |
| 6,222,356 B1 | 4/2001 | Taghizadeh-Kaschani |
| 6,268,756 B1 | 7/2001 | Nayebi et al. |
| 6,304,066 B1 | 10/2001 | Wilcox et al. |
| 6,307,356 B1 | 10/2001 | Dwelley |
| 6,313,610 B1 | 11/2001 | Korsunsky |
| 6,366,070 B1 | 4/2002 | Cooke et al. |
| 6,396,250 B1 | 5/2002 | Bridge |
| 6,404,261 B1 | 6/2002 | Grover et al. |
| 6,476,589 B2 * | 11/2002 | Umminger et al. ......... 323/282 |
| 6,498,466 B1 | 12/2002 | Edwards |
| 6,509,721 B1 | 1/2003 | Liebler |
| 6,522,178 B2 | 2/2003 | Dubhashi et al. |
| 6,541,947 B1 * | 4/2003 | Dittmer et al. ............. 323/284 |
| 6,611,131 B2 | 8/2003 | Edwards |
| 6,724,174 B1 | 4/2004 | Esteves et al. |
| 6,744,241 B2 | 6/2004 | Feldtkeller |
| 6,828,766 B2 | 12/2004 | Corva et al. |
| 6,873,140 B2 | 3/2005 | Saggini et al. |
| 6,894,471 B2 | 5/2005 | Corva et al. |
| 7,030,596 B1 | 4/2006 | Salerno et al. |
| 2003/0025484 A1 | 2/2003 | Edwards |

* cited by examiner

CURRENT MODE SWITCHING REGULATOR WITH PREDETERMINED ON TIME

CLAIM OF PRIORITY

This patent application, and any patent(s) issuing therefrom, claim priority to U.S. provisional patent application No. 60/557,695, filed on Mar. 31, 2004, which is incorporated herein by reference in its entirety.

FIELD OF THE INVENTION

The present invention relates to switching regulators, and more particularly, to switching regulators capable of high efficiency operation over a wide range of supply voltage and load current by utilizing a simplified dual mode controller that provides both good transient response and high steady state accuracy.

BACKGROUND OF THE INVENTION

As is known in the prior art, in order to provide a fast response to large changes in load current and input supply voltage, the most frequently used form of step down or buck switching regulator employs constant frequency peak current control. An example of such a prior art switching regulator is illustrated in FIG. 1(a). FIG. 1(b) contains timing diagrams illustrating discontinuous current mode and continuous current mode operation of the prior art switching regulator of FIG. 1(a).

Referring to FIG. 1(a), the switching regulator includes an input voltage source 101 having a first lead coupled to a first lead of a switch, SW 103; a current measurement unit 102; a diode 137 having a cathode coupled to a second lead of the switch 103; an inductor 105 having a first lead coupled to the second lead of the switch 103; a capacitor 106 having a first lead coupled to a second lead of the inductor 105; a pair of resistors R1, R2, 111, 110 coupled in series with one another and coupled in parallel with the capacitor 106, a load 112 coupled in parallel with the capacitor 106, and a control circuit 200, which functions to control the overall operation of the switching regulator. As shown in FIG. 1(a), second leads of each of the voltage source 101, the diode 137 (i.e., the anode), the capacitor 106, the series resistors 110, 111 and the load 112, are coupled to ground.

The control circuit 200 includes an error amplifier 114 which receives a reference voltage in its non-inverting input; a loop filter 115 which receives the output of the error amplifier 114; a summing unit 118 which receives the output from the loop filter 115 as one input and the output of the current measurement unit 102 as a second input; a comparator 119 which receives the output of the summing unit 118 as an input; a clock generator 121; and a latch 123 (e.g., an SR flip-flop), which receives both the output of the clock 121 and the output of the comparator 119, as input signals. As also shown in FIG. 1(a), the output of the latch 123 functions as a control signal for controlling the opening and closing of switch 103, and a portion of the voltage across load 112 is fed back to the inverting input of the error amplifier 114 of the control circuit 200. The operation of the switching regulator illustrated in FIG. 1(a) will now be described.

Referring again to FIGS. 1(a) and 1(b), during operation a fraction of the regulated output voltage, across load 112, is determined by resistors $R_2$ 110 and $R_1$ 111, and this voltage is coupled to the negative terminal or inverting input of the error amplifier 114 via lead 109. A set point or reference voltage 113, which is determined based on the desired load voltage, is provided to the positive terminal or non-inverting input of the error amplifier 114. The output of the error amplifier represents the difference between the desired and measured value of the output voltage 108. The output of the error amplifier is coupled to the loop filter 115, which functions to provide frequency compensation for the control loop to insure suitable transient response and steady state accuracy.

Clock 121 produces pulses at a repetition period $T_{CLOCK}$, which is used to set the S-R latch 123 via the set input, S, causing the Q-output of S-R latch 123 to turn ON switch SW 103 through lead 124. While switch SW 103 remains ON, the current through inductor 105 gradually increases. The increasing value of inductor current $I_L$ 104 is converted to a proportional voltage by switch current measurement unit 102, and the converted voltage is then applied to the input 131 of summing unit 118 via lead 117. The output 132 of summing unit 118, which indicates the voltage difference between the output 116 of loop filter 115 and the measured increasing inductor current $I_L$ 104, is converted to a logic level by comparator 119. The output of comparator 119 is then applied to the reset input of S-R latch 123. When the S-R latch 123 is reset by the output of comparator 119 signal at input 135, switch SW 103 turns OFF. It is noted that this occurs when the inductor current $I_L$ 104 reaches a positive value set by the output of the loop filter 115.

When the switch SW 103 is turned OFF, inductor current $I_L$ 104 flows through the diode 137 until it reaches zero, and remains zero until the next clock pulse is generated by clock 121 if the load current $I_{Load}$ is small. As shown in FIG. 1(b), immediately after switch-ON time $T_{ON}$ expires (i.e. $T_{ON}=0$), inductor current $I_L$ 104 declines to zero until switch SW 103 is turned ON again. If the load current $I_{LOAD}$ 107 is assumed small, inductor current $I_L$ 104 remains zero until the next clock pulse or cycle. Alternatively, if the load current $I_{LOAD}$ 107 is large, the value of inductor current $I_L$ 104 reaches $I_{VALLEY}$ at the next clock pulse (i.e., the load current does not go to zero), as shown in FIG. 1(b). Capacitor 106 smoothes and averages the inductor current $I_L$ 104 to produce load current $I_{LOAD}$ 107.

In the case where the inductor current $I_L$ 104 is zero for some period of the cycle, the mode of operation is referred to as discontinuous current mode or DCM, while the case where the inductor current $I_L$ 104 is greater than zero for the entire duration of the cycle is referred to as continuous current mode or CCM.

While the foregoing circuitry is operable as a switching regulator, it is inadequate for use in many applications including, for example, portable battery powered devices (e.g., cell phones). As is known, in order to maximize run time on battery charge, regulators for these devices must provide very high efficiency under conditions of widely varying load and input voltages. The prior art technique described above and illustrated in FIG. 1(a) is inadequate because it suffers from significant losses due to a forward voltage drop in the diode 137.

Attempted prior art solutions for this problem have been focused on replacing the diode with a low side MOS transistor switch for much smaller "ON" voltage drop. Nonetheless, this approach requires significant changes to the controller in order to generate the proper gate drive signal for the MOS transistor switch.

In continuous current mode, the gate drive signal for the low side switch is normally the inversion of the drive signal for the main switch. In contrast, discontinuous current mode requires the low side switch to be turned OFF at the time when the inductor current falls to zero to prevent reverse current flow and large power losses. Furthermore, the operation of the low side switch and the main switch must be non-overlapping or must not be simultaneous cross-conducting. If both switches are ON at the same moment for even a short period of time, a large shoot-through current flows from the input voltage VIN to ground GND, which can dramatically impair the efficiency of the circuit and even possibly damage the switches due to overheating. Conversely, if both switches are turned OFF simultaneously, "dead time" or a non-conducting period is generated, causing the inductor current to flow through the body diodes of the switches and resulting in power losses due to the large forward voltage drop of the diodes.

One method of correcting the foregoing problem is by incorporating an adaptive dead time gate drive controller. Detailed discussions of this solution can be found, for example, in U.S. Pat. No. 6,396,250, titled "CONTROL METHOD TO REDUCE BODY DIODE CONDUCTION AND REVERSE RECOVERY LOSSES." In brief, the disclosed device senses the voltage of the terminal between the high-side switch and the low-side switch to provide an indication of pulse delay period for activating the high-side switch or the low-side switch. A learning circuit is used to set the time delays to a minimum value to avoid shoot-through current. Thus, by minimizing the non-overlap times where the body diode of a synchronous rectifier conducts, power losses are reduced. However, this prior art is defective in that the additional components associated with this learning circuit increase cost and design complexity to the point where the design is no longer a practical solution for many applications.

Another disadvantage of the conventional method, as illustrated in the regulator of FIG. 1(a), results from the additional reduction in efficiency caused by switching losses in the gate drives for the MOS switches. These losses are especially significant at low load currents because the switching losses occur at every transition of the clock, even though the small load currents could easily be supplied from the charge stored in capacitor 106 for relatively long periods of time without appreciable change in output voltage 108, for example, by switching much less frequently.

To remedy this problem, it has been proposed that the controller for controlling the switching regulator be operated in bursts separated by periods of "sleep time" when all the power switches and portions of the controller are turned OFF. This method minimizes the switching losses at small load currents. Detailed discussions of this prior art technique can be found in U.S. Pat. No. 6,304,066, titled "CONTROL CIRCUIT AND METHOD FOR MAINTAINING HIGH EFFICIENCY OVER BROAD CURRENT RANGES IN A SWITCHING REGULAR CIRCUIT," and U.S. Pat. No. 6,307,356, titled "VOLTAGE MODE FEEDBACK BURST MODE CIRCUIT." Nonetheless, one shortcoming of this method is that it requires extensive additions to the controller of the switching regulator, further complicating the circuit. Such switching regulators are also not maximally effective from an efficiency viewpoint since it still allows multiple switching cycles during the burst.

Another shortcoming of the fixed frequency current mode switching regulator shown in FIG. 1(a) results from an inherent stability problem when the duty cycle for switching $T_{ON}$ to $T_{CLOCK}$ exceeds 50% (i.e. when the switch is ON for more than 50% of any given switching cycle). Since controlling the duty cycle of switch SW 103 regulates the load voltage 108, when the duty cycle for $T_{ON}$ to $T_{CLOCK}$ exceeds 50%, switch SW 103 causes the load voltage and therefore the switching regulator 100 to become unstable. This phenomenon is of concern because it prevents the switching regulator's full current supply capabilities to be carried out at higher duty cycles. To maintain stability of the current mode switching regulator, the current-derived signal used in the controller for controlling the switching regulator can be adjusted by supplying a slope compensation signal. However, at large duty cycle, slope compensation in turn causes a reduction in load current and power efficiency of the switching regulator.

U.S. Pat. No. 6,498,466, titled "CANCELLATION OF SLOPE COMPENSATION EFFECT ON CURRENT LIMIT," recommends a solution to this dilemma by providing a control circuit for the current mode switching voltage regulator that can adjust its switching threshold with respect to the magnitude of a slope compensation signal so that a substantially constant maximum current limit of the regulator may be maintained at greater duty cycles. The drawback of this method is that the implementation of such a control circuit adds a significant amount of electrical components to the switching regulator, resulting in increased size, cost and design complexity to the controller.

SUMMARY OF THE INVENTION

In view of the foregoing, it is a primary objective of the invention to provide a simplified switching regulator that eliminates the foregoing drawbacks associated with the prior art methods and designs.

According to one embodiment of the present invention, an exemplary power switching regulator comprises a common terminal; an input terminal for supplying a direct current input; an output terminal; a recirculating diode having a first terminal connected to the common terminal; an inductor having a first terminal connected to a second terminal of the recirculation diode and a second terminal connected to the output terminal; a capacitor having a first terminal connected to the output terminal and a second terminal connected to the common terminal; a switch connected between the input terminal and the first terminal of the inductor, the switch operable for switching between an ON state in which the direct current input is coupled to the inductor, and an OFF state in which the direct current input is isolated from the inductor; and a controller coupled to the switch and operable for controlling the amount of time the switch is in the ON state and the OFF state such that the duration of time the switch is in the ON state is inversely proportional to the difference between the voltage at the input terminal and the voltage at the output terminal.

One advantage of the present invention is that it provides a current mode switching regulator with the capability of operating at switch ON duty cycles of up to 100% that can be implemented without the use of slope compensation by utilizing a predetermined value of switch ON time $T_{ON}$.

Another advantage of the present invention is to provide a controller which employs an integration of error between the desired and actual values of output voltage in order to improve the regulation accuracy of the output voltage beyond that provided by controllers having only proportional error control.

Another advantage is that the controller of the present invention operates in both the discontinuous inductor current mode "DCM" at small values of load current to thereby provide superior light load efficiency, and the continuous inductor current mode "CCM" at large values of load current for the purpose of reducing the value of ripple current in the inductor and output capacitor (and therefore the ripple voltage at voltage output) as well as providing superior efficiency at heavy loads.

Yet another advantage is the automatic transition realized between DCM and CCM and the use of current mode control provides rejection of both load current and input voltage changes in the output voltage as well as minimizes changes in transient response time as a function of load current operating point.

Another advantage is that the circuit of the present invention employs continuous time direct monitoring without a sampling clock of the error signal before the loop filter, which eliminates the delays due to filter slew rate and clock period.

Additional objects, advantages, and novel features of the invention will become apparent to those skilled in the art upon examination of the following description, or may be learned by practice of the inventions. While the novel features of the invention are set forth below, the invention, both as to organization and content, will be better understood and appreciated, along with other objects and features thereof, from the following detailed description taken in conjunction with the drawings.

BRIEF DESCRIPTION OF THE DRAWINGS

The accompanying drawings, which are incorporated into and form a part of the specification, illustrate several aspects and embodiments of the present invention and, together with the general description given above and detailed description given below, serve to explain the principles of the invention. Such description makes reference to the annexed drawings. The drawings are only for the purpose of illustrating preferred embodiments of the invention and are not to be treated as limiting the invention. In the drawings.

Throughout the above-mentioned drawings, identical reference numerals are used to designate the same or similar component parts.

DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein: rather, these embodiments are provided so that this disclosure will be thorough and complete, and will fully convey the scope of the invention to those skilled in the art, like numbers refer to like elements throughout.

Figure 1A:
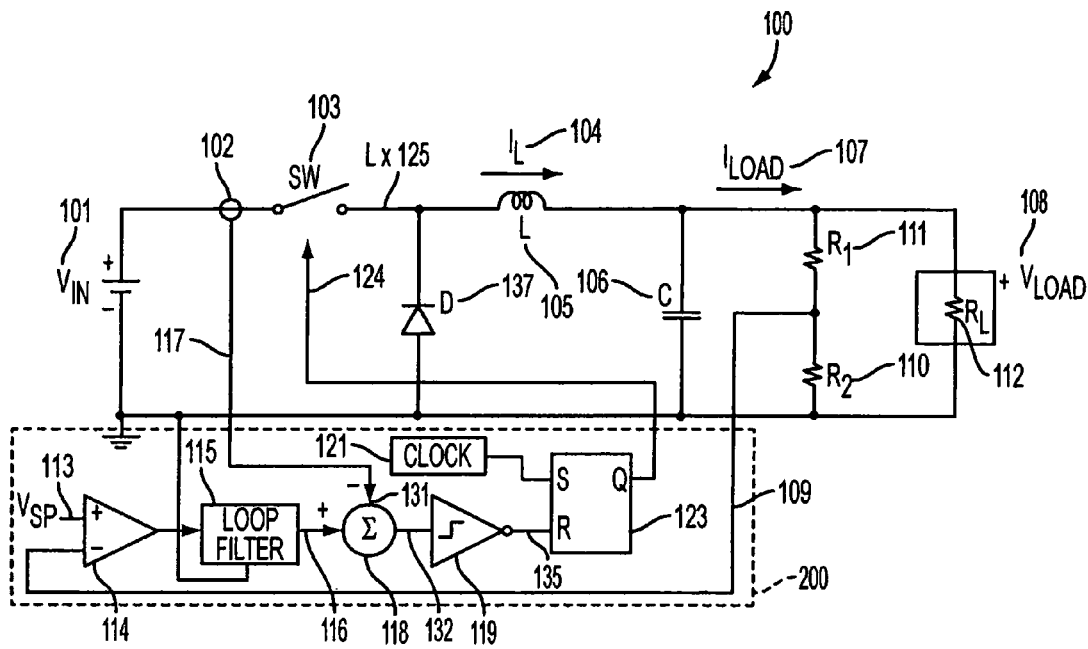
FIG. 1(a) illustrates a schematic diagram of a prior art switching regulator.
Figure 1B:
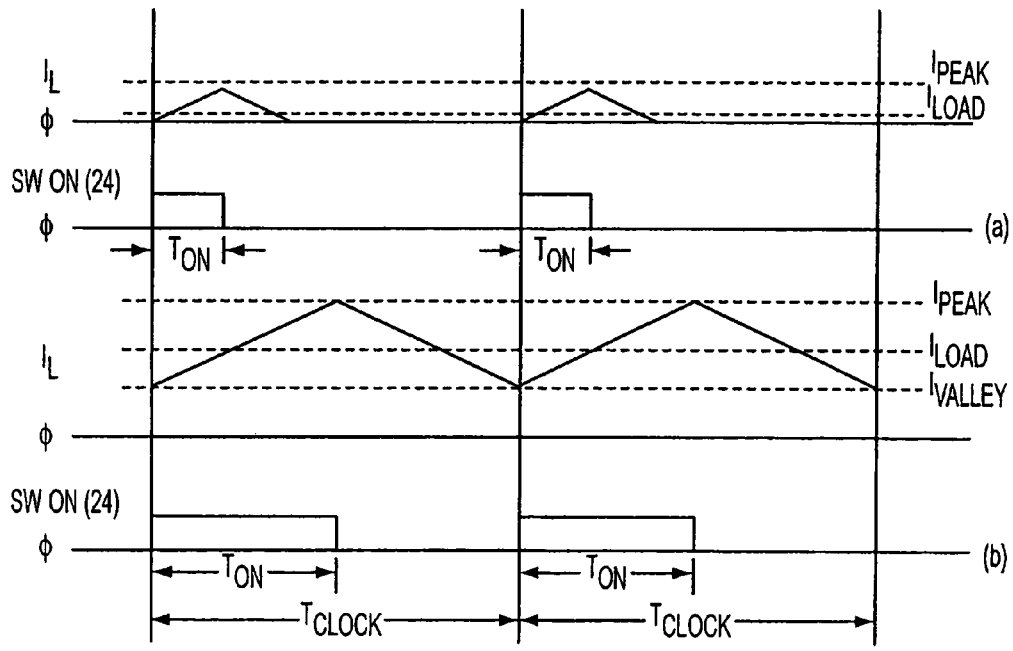
FIG. 1(b) is a timing diagram illustrating the operation of the switching regulator of FIG. 1(a).
Figure 2:
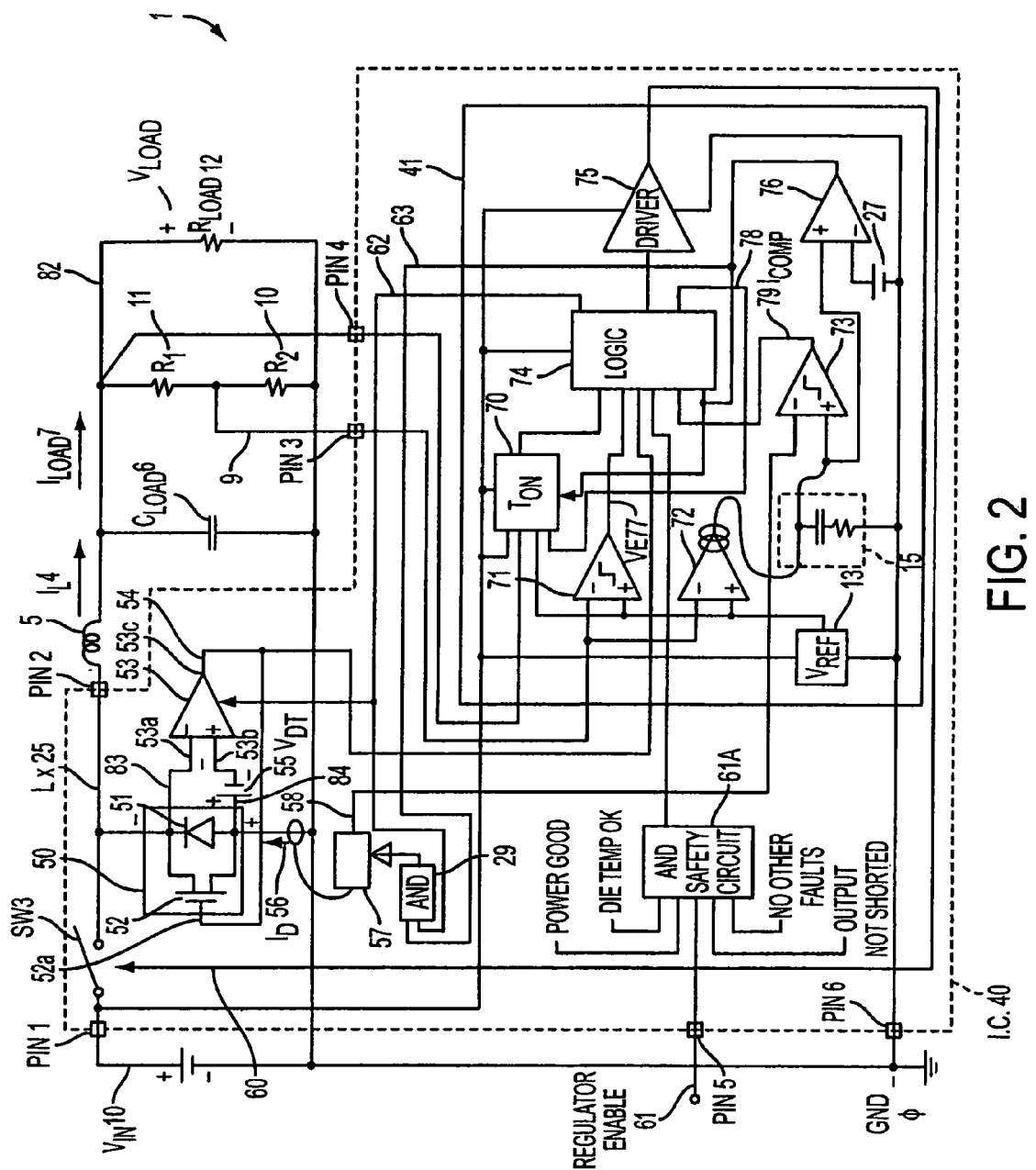
FIG. 2 illustrates a schematic diagram of an exemplary embodiment of a current mode switching regulator according to the present invention.

FIG. 2 illustrates an exemplary current mode switching regulator in accordance with the present invention. Referring to FIG. 2, in the given embodiment, the switching regulator 1 includes a voltage source $V_{IN}$ 10 having a first lead coupled to a first lead of a switch, SW3. $V_{IN}$ is preferably supplied by conventional sources such as batteries or other power sources, and the switch SW 3 is preferably a type of positive-channel metal-oxide semiconductor transistor or PMOS transistor.

The switching regulator further includes a diode 50 and a voltage amplifier 53, where the cathode terminal 83 of diode 50 is connected to the second lead of switch SW3 and to the inverting terminal 53a of voltage amplifier 53, and the anode terminal 84 of diode 50 is coupled to ground and to the non-inverting terminal 53b of voltage amplifier 53 via a reference voltage VDT 55 as shown in FIG. 2. In the preferred embodiment, diode 50 comprises an NMOS transistor 52 and its body diode 51. As shown in FIG. 2, the drain terminal of NMOS transistor 52 is coupled to the cathode of body diode 51, and forms the cathode terminal of diode 50. The source terminal of NMOS transistor 52 is coupled to the anode of body diode 51, and forms the anode terminal of diode 50. It is noted that the value of reference voltage $V_{DT}$ 55 is chosen to be as small as possible but always larger than the magnitude of the largest possible value of the input offset voltage of voltage amplifier 53. The output of the voltage amplifier 53 is coupled to the control circuit 41 and is also fed back to the gate of NMOS transistor 52.

Continuing, the switching regulator 1 further includes an inductor 5 having a first lead coupled to the second lead of the switch SW3; a capacitor 6 having a first lead coupled to a second lead of the inductor 5; a pair of resistors R1, R2, 11, 10 coupled in series with one another and coupled in parallel with the capacitor 6, and a load 12 coupled in parallel with the capacitor 6. As shown in FIG. 2, second leads of each of the voltage source 10, the diode 50 (i.e., the anode), the capacitor 6, the series resistor 10, and the load 12, are coupled to ground.

The switching regulator also includes a controller 41 which functions to control the operation of the foregoing circuitry. More specifically, in the given embodiment, the controller 41 comprises a timer circuit $T_{ON}$ 70, comparators 71, 73 and 76, transconductance amplifier 72, driver 75, loop filter 15, logic circuit 74 and reference voltage 13. Each of the foregoing components may be implemented in numerous manners. It is also noted that some of the components may not be necessary for a given application depending on the configuration and application of the switching regulator. It is further noted that in the preferred embodiment, power for the components contained in controller 41 is supplied by $V_{IN}$ 10.

Referring to FIG. 2, the timer circuit $T_{ON}$ 70 receives signals $V_{IN}$, $V_{LOAD}$, $V_{REF}$ and an output signal from logic circuit 74 as input signals. Comparator 71 and amplifier 72 both receive the $V_{REF}$ signal and a predetermined portion of the output voltage $V_{LOAD}$ as determined by resistors R1 and R2 as input signals. Logic circuit 74 receives the output of timing circuit $T_{ON}$ 70, the output of comparator 71, the output of voltage amplifier 53, the output of the enable circuit 61A, the output of comparator 73 and the output of comparator 76 as input signals. Logic circuit 74 provides output signals enable active diode 62, SW ON signal to driver 75, and RUN $T_{ON}$ 78. The functions of logic circuit 74 utilizing these previously identified inputs to generate the identified outputs are defined by the logic state diagram of FIG. 3, which also describes the overall operation of the regulator 1.

The switching regulator of the present invention also includes a current measuring circuit 57, which operates to measure the current flowing through diode 50. The current measuring circuit 57 is enabled by controller 41 via AND gate 29, which receives as input signals, signals generated by logic circuit 74 and comparator 76.

Referring again to FIG. 2, the output of transconductance amplifier 72 is coupled to the input of the loop filter 15. The output of the loop filter 15 is coupled to the non-inverting inputs of both the comparator 73 and the comparator 76. The inverting input of comparator 73 receives the output of current measuring circuit 58 as an input signal, and the inverting input of comparator 76 is coupled to an offset voltage 27.

The switching regulator of the present invention may also include a safety circuit 61A which is controlled via a REGULATOR ENABLE 61 signal. The safety circuit 61A operates to verify and check, for example, temperature, power, shorted output and possible faults, of the components contained within the dashed lines 40, which are preferably formed in a single integrated circuit, for example, an application-specific integrated circuit or ASIC. In the embodiment of FIG. 2, the ASIC comprises I/O pins denoted by PIN 1, PIN 2, PIN 3, PIN 4, PIN 5 and PIN 6.

The operation of the switching regulator illustrated in FIG. 2 is now described. As noted above, inductor 5 is coupled between the switch SW 3 and load 12. The cathode terminal 83 of diode 50 is connected to the junction of switch SW 3 and inductor 5 while the anode terminal 84 of diode 50 is connected to common ground GND 0 to form a conventional buck or step down switching regulator 1. In order to significantly reduce the power loss of diode 50, voltage amplifier 53 has its inverting input terminal 53a connected to the cathode terminal 83 of diode 50 and its non-inverting input terminal 53b connected to the negative terminal 55a of reference voltage $V_{DT}$ 55. The positive terminal 55b of reference voltage $V_{DT}$ 55 is coupled with the anode terminal 84 of diode 50, and the output 53c of the voltage amplifier 53 is coupled to the gate terminal 52a of the NMOS transistor 52 and its included body diode 51. As previously mentioned, the value of reference voltage $V_{DT}$ 55 is selected to be as small as possible but larger than the magnitude of the largest value of the input offset voltage of voltage amplifier 53, typically about 10 millivolts. Thus, when positive or forward diode current $I_D$ 56 flows into diode 50, voltage amplifier 53 regulates the gate voltage of NMOS transistor 52 so as to constantly maintain the diode forward voltage $V_D$ very small in magnitude but positive in polarity, generally between zero and $2 \times V_{DT}$. When diode current $I_D$ 56 reverses and becomes negative, the polarity of diode forward voltage $V_D$ also becomes negative, making the output 53c of voltage amplifier 53 approach its most negative value, for example, ground, and thereby causing the NMOS transistor 52 and body diode 51 of diode 50 to be non-conductive. As a result, the diode 50 operates with low forward voltage drop and small reverse current and therefore behaves like a near-ideal diode, where the diode 50 has no control input other than its own active voltage between the anode terminal 84 and cathode terminal 83.

Thus, the diode 50 of the present invention is not a synchronous rectifier or synchronous switch in the usual meaning of the foregoing terms but rather an "active diode." For additional power savings, the voltage amplifier 53 can be powered off when it is not utilized by means of signal line 62 from the controller 41. Furthermore, it is also possible to add a Schottky diode (not shown) external to the integrated circuit (which is enclosed by dash lines 40 in FIG. 2) in parallel with the body diode 51 to further improve efficiency of the switching regulator.

The operation of the switch SW 3 is controlled by the output signal 60 generated by driver 75 of the controller 41. The output signal of driver 75 is directed to the control switch SW 3 so as to turn the switch ON for a predetermined time, thereby regulating the load voltage $V_{LOAD}$ to the desired value. In order to effect desired operation of the switching regulator utilizing output signal 60 of controller 41, inputs external to the integrated circuit enclosed by dash lines 40, such as input voltage $V_{IN}$, ground GND 0, load voltage $V_{LOAD}$, fractional voltage on lead 9 at resistor $R_1$ 11 and $R_2$ 10 defined by Equation (1):

$$V_9 = \frac{R_2}{R_1 + R_2} \times V_{LOAD} \qquad (1)$$

and REGULATOR ENABLE 61 are provided in addition to input signals internal to the integrated circuit enclosed by dash lines 40 such as diode current $I_D$ 56 and diode gate voltage at RECIRCULATE 54 to the controller 41.

Figure 3:
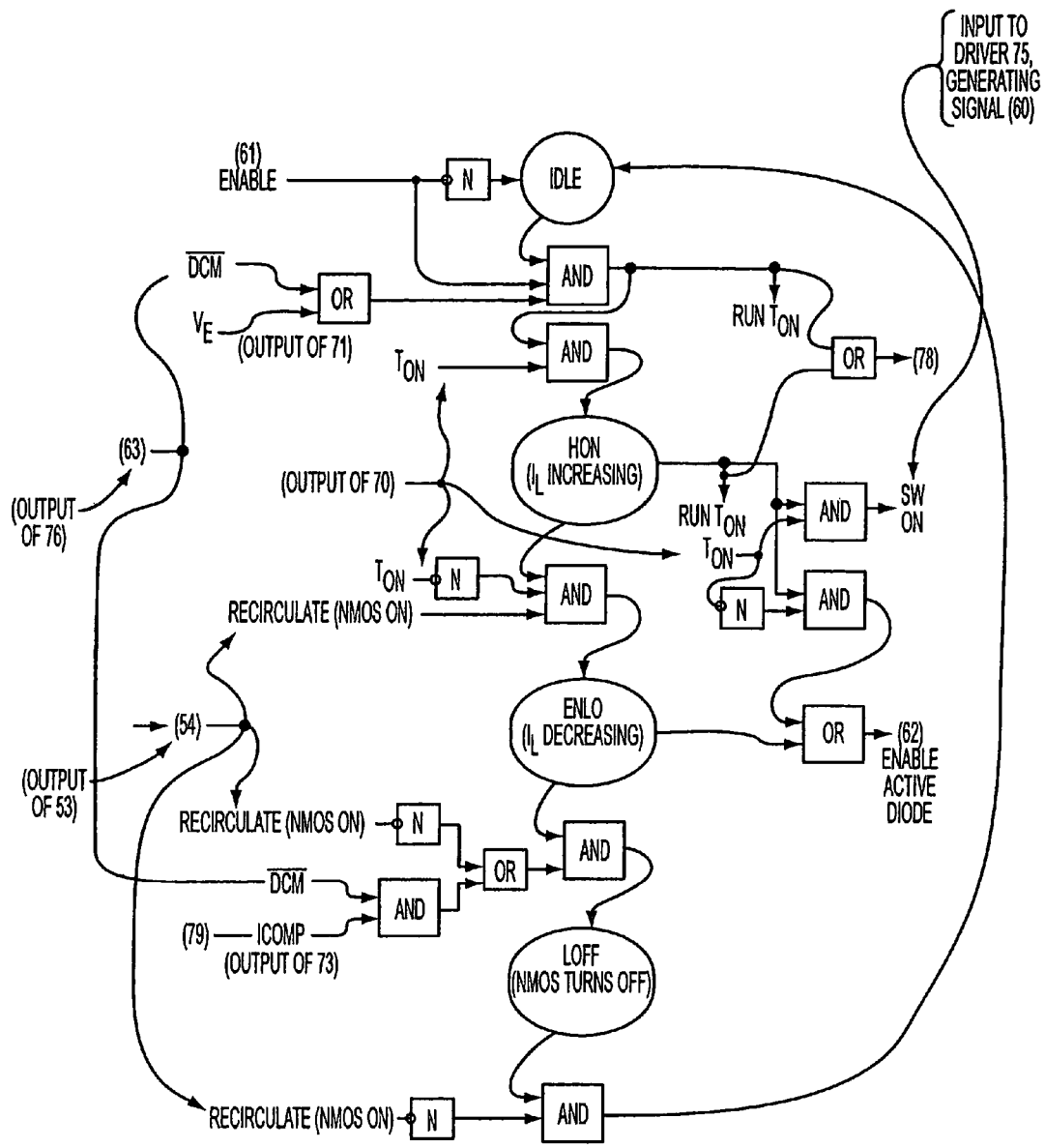
FIG. 3 illustrates a state diagram indicating the operational states and control logic of the exemplary embodiment of the present invention shown in FIG. 2.

FIG. 3 is a state diagram illustrating the operation of the exemplary embodiment of the present invention including logic circuit 74 shown in FIG. 2. Referring to FIG. 3 in conjunction with FIG. 2, the operation of the switching regulator is as follows.

Controller 41 functions to control switch SW3 to be in one of two states, either ON or OFF, to effect regulator operation. When the load current $I_{LOAD}$ 7 is small, the switching regulator operates in a discontinuous inductor current mode, or DCM, characterized by inductor current $I_L$ 4 being substantially zero for some period of time, during which both switch SW 3 and diode 50 are OFF or non-conducting. This state is referred to as the "IDLE" controller state. For the purposes of the following discussion, one cycle of the regulator operation in DCM can start in the IDLE state with switch SW3 and diode 50 OFF. In this state, the load 12 causes the voltage in the load capacitor 6 to decrease until the voltage on lead 9 becomes less than the reference voltage $V_{REF}$ 13, causing the output $V_E$ 77 of comparator 71 to become a logic H, which transitions the controller 41 from "IDLE" to "$H_{ON}$" controller state, asserting output 78 from logic circuit 74, starting timer $T_{ON}$ 70 and turning ON switch SW 3.

Referring to FIG. 3, this transition from "IDLE" state to "$H_{ON}$" occurs when the controller 41 is enabled and either the load voltage (a portion of which is represented on signal line 9) falls below the voltage level Of $V_{REF}$13 (i.e., $V_E$77=H), or the loop filter voltage is greater than the threshold of comparator 76 (i.e., signal 63, /DCM=H). Once this occurs, the controller transitions to the "$H_{ON}$" state, where the output of $T_{ON}$ is made active for a predetermined period of time, and SW 3 is closed.

During the "$H_{ON}$" controller state, inductor current $I_L$ 4 continues to increase until timer $T_{ON}$ expires. When $T_{ON}$ expires (i.e., becomes logic L), switch SW 3 turns off through signal 60. Importantly, however, the transition to the "$E_{NLO}$" controller state does not occur until the inductor current starts recirculating through diode 50 causing signal 54 to become logic H. It is this operation of the switching regulator that prevents shoot through when switch SW 3 turns off and transistor 52 turns off. Referring to FIG. 3, the transition from the "H$_{ON}$" state to the "E$_{NLO}$" state occurs when T$_{ON}$ expires at the end of the timer period while the Run T$_{ON}$ signal remains logic high. It is noted that Run T$_{ON}$=H enables the Run timer and Run T$_{ON}$=L resets the timer in the same manner a time-out does. T$_{ON}$ is the output signal of the timer and it becomes logic H when Run T$_{ON}$ is logic H and stays logic high until the T$_{ON}$ time is exceeded or Run T$_{ON}$ becomes logic L.

While the controller 41 remains in "E$_{NLO}$" controller state, the inductor current I$_L$ 4 recirculates through the active diode 50 and gradually decreases in magnitude toward zero. When inductor current I$_L$ 4 reaches zero, the active diode 50 is turned OFF due to the output of the amplifier 53 being a logical low, which makes the gate voltage of NMOS transistor 52 a logical low causing the NMOS transistor 52 to turn off. The turning off of NMOS transistor 52 results in the transitioning of the switching regulator into the "L$_{OFF}$" controller state by signal 54. It is also noted that the switching regulator can transition from the E$_{NLO}$ mode to the L$_{OFF}$ mode if the loop filter voltage is greater than the threshold voltage of comparator 76, (/DCM=H), and I$_{COMP}$ 79 becomes logical high as shown in FIG. 3. It is noted that the inductor current is less than the level commanded by the loop filter, but positive. Further, the positive value of signal 58 corresponds to the positive direction of I$_D$ 56.

In the "L$_{OFF}$" controller state, because the voltage at output of amplifier 53 (which is referred to as the RECIRCULATE signal 54) is already a logic L (i.e., OFF), the controller 41 immediately transitions the switching regulator back to the "IDLE" controller state, which is the assumed starting point for the entire DCM operating cycle.

As the load increases, V$_{LOAD}$ decreases much faster during the "IDLE" controller state so that the zero inductor current I$_L$ 4 period of the DCM operation becomes shorter and shorter until it ceases to exist. Since the time switch SW 3 is ON for a given cycle is fixed at T$_{ON}$ by timer circuit T$_{ON}$ 70, and the maximum value of valley current I$_{VALLEY}$, or negative peak inductor current, is kept at zero by the sequencer and active diode 50 in DCM, upon a further drop in V$_{LOAD}$, the average input voltage to the error transconductance amplifier 72 becomes negative, and the output voltage of the loop filter 15 becomes positive and increasing. This causes the output of comparator 76 to become logic H, indicated by /DCM=H, and switches the controller operation mode to continuous current mode or CCM.

In CCM, (i.e. /DCM=H), the switch-ON time "T$_{S\_ON}$" (i.e., the time SW 3 is ON) of the timer circuit T$_{ON}$ 70 is reduced to 90% of its value in DCM. If the switching regulator is assumed to be in the "IDLE" controller state as a starting point, /DCM=H upon start of recirculation causes Run T$_{ON}$, the timer circuit T$_{ON}$ 70 immediately makes signal T$_{ON}$ active, and the switching regulator then transitions to the "H$_{ON}$" controller state and turns ON switch SW 3. When the signal output of timer circuit T$_{ON}$ 70 expires at the end of 90% T$_{ON}$ time of that in DCM, switch SW 3 turns OFF, the active diode 50 is enabled, the RECIRCULATE logic signal output by the amplifier 53, signal 54, becomes H and the switching regulator transitions to the "E$_{NLO}$" controller state with the inductor current I$_L$ 4 recirculating in diode 50. In CCM, the current measuring circuit 57 for diode current I$_D$ 56 is active, and the value of I$_D$, which represents the present valley current I$_{VALLEY}$ is output on lead 58 to the inverting terminal of comparator 73. Since the value of diode current I$_D$ 56 is near its peak and also greater than the target value of valley current I$_{VALLEY}$ set by the output of the loop filter 15, output current I$_{COMP}$ 79 of comparator 73 is logic L. However, as diode current I$_D$ 56 decreases, I$_D$ 56 eventually reaches the target value for the valley current I$_{VALLEY}$. This changes the output of comparator 73, I$_{COMP}$ 79, from logic L to logic H, and transitions the switching regulator to the "L$_{OFF}$" controller state, disabling voltage amplifier 53 and current measuring circuit 57 by signal 62. When the voltage level of RECIRCULATE signal 54 reaches the threshold for logic L (i.e., NMOS 52 OFF), the switching regulator transitions to the "IDLE" controller state and then immediately to the "H$_{ON}$" controller state (because /DCM=H), which is the assumed starting point for the entire cycle in CCM. The switching regulator then repeats this cycle.

In CCM, the switching regulator 1 under control of controller 41 operates in a classic current mode where the valley current I$_{VALLEY}$ is adjusted to make the steady state value of the load voltage V$_{LOAD}$ exactly match the desired value by integrating any deviation of the load voltage V$_{LOAD}$ from the desired value via the error amplifier 72 and loop filter 15. When operating in CCM and the load decreases, the load voltage V$_{LOAD}$ tends to rise, causing the output of the loop filter 15 and the value of the valley current I$_{VALLEY}$ to decrease until comparator 76 switches to logic L, making /DCM=L and DCM=H, which results in switching the controller 41 to DCM operation. Consequently, the switching regulator remains in the "IDLE" controller state with switch SW 3 turned OFF until V$_{LOAD}$ decreases to (and possibly lower than) the desired value, at which point the output V$_E$ 77 of comparator 71 becomes logic H and the DCM control cycle resumes and repeats as described above.

In accordance with the operation of the switching regulator in the foregoing embodiment of the present invention, it is desired that the switch-ON time T$_{S\_ON}$ in DCM equals to a predetermined time value T$_T$ such that the value of valley current I$_{Lvalley}$ to peak current I$_{Lpeak}$ of inductor current I$_L$ 4 be of value I$_T$. Preferably, this value I$_T$ is independent of supply voltage V$_{IN}$, load voltage V$_{LOAD}$, operating temperature, or internal integrated circuit component tolerance, etc., as much as possible. As such, the change in value I$_T$ of the inductor current I$_L$ 4 during the switch-ON time of switch SW 3 is (I$_{Lpeak}$−I$_{Lvalley}$) and also given by equation (1):

$$I_T = (I_{Lpeak} - I_{Lvalley}) = \frac{(V_{IN} - V_{LOAD}) * T_T}{L} \quad (2)$$

Accordingly, the predetermined time value T$_T$, which is the desired switch-ON time T$_{S\_ON}$ in DCM operation, can be rewritten as shown in equation (3) given by:

$$T_T = \frac{I_T * L}{(V_{IN} - V_{LOAD})} \quad (3)$$

Equation (3) provides the predetermined time value T$_T$ or the desired value of switch-ON time T$_{S\_ON}$ in DCM operation.

Figure 6:
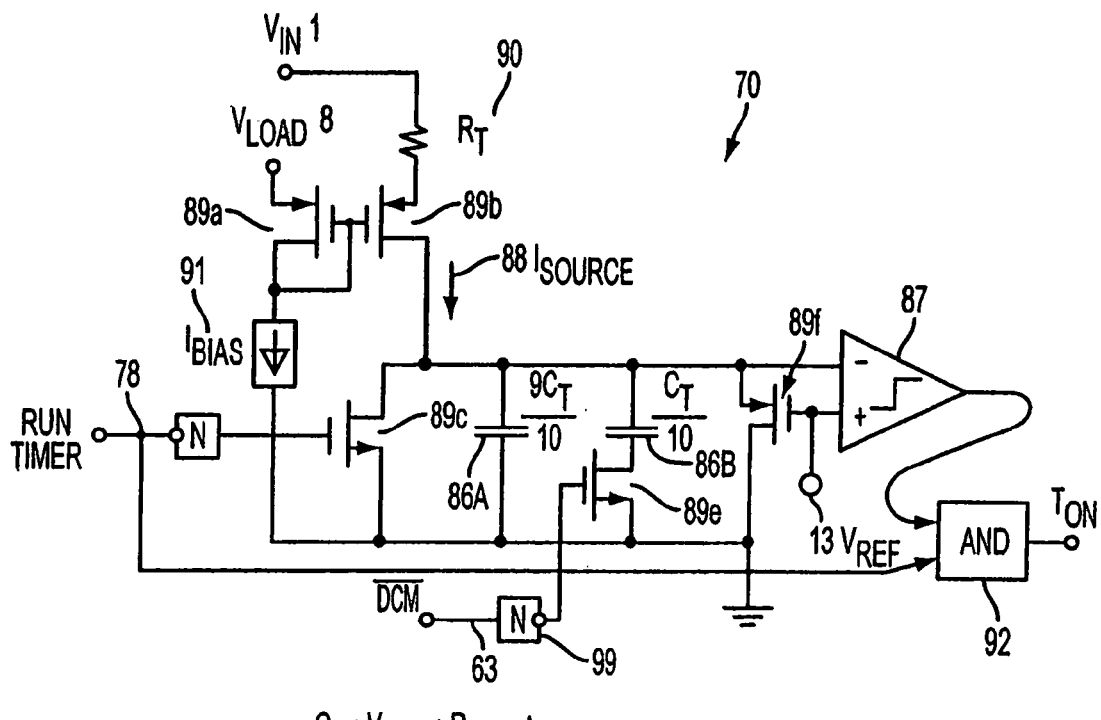
FIG. 6 illustrates an exemplary $T_{ON}$ circuit in accordance with the present invention.

FIG. 6 illustrates an exemplary circuit for implementing timer circuit T$_{ON}$ 70 in accordance with the present invention. Referring to FIG. 6, timer circuit T$_{ON}$ 70 receives input signals V$_{IN}$ 1, V$_{LOAD}$ 8, V$_{REF}$ 13, Run Timer 78, and /DCM 63. It is noted that these signals correspond to the same signals illustrated in FIG. 2. The timer circuit T$_{ON}$ 70 includes a current mirror formed by transistors 89a and 89b, a resistor 90 for coupling V$_{IN}$ to the current mirror, a current source 91 coupled to transistor 89a of the current mirror.

Timer circuit $T_{ON}$ 70 further includes a transistor 89c having a drain terminal coupled to the drain of transistor 89b, a source terminal coupled to ground, and a gate terminal coupled to the Run Timer 78 input signal via an inverter; a first capacitor 86a coupled in parallel with switch 89c; a second capacitor 86b coupled in series with a switch 89e, both of which are coupled in parallel with the first capacitor; a switch 89f coupled in parallel with the series combination of the second capacitor 86b and switch 89e; comparator 87 having an inverting input coupled to the drain of transistor 89b and a non-inverting input coupled to the gate of switch 89f and VREF 13; and an AND gate which receives the output of the comparator 87 and the RUN Timer signal 78 as input signals. As shown, signal 63 (/DCM) is coupled to the gate input of transistor 89e via an inverter 99. As indicated in FIG. 6, the value of the capacitance of the first capacitor 86a is 9/10×$C_T$, and the value of the second capacitor 86b is $C_T$/10. One advantage of this embodiment of timer circuit $T_{ON}$ 70 is that it exhibits low sensitivity to the operating environment.

During operation, when DCM is logic H, the switch-ON time $T_{S\_ON}$ of timer circuit $T_{ON}$ 70 is given by equation (4):

$$T_{S\_ON} = \frac{C_T * V_{REF} * R_T}{(V_{IN} - V_{LOAD})} \quad (4)$$

However, as discussed earlier, in CCM (i.e. DCM=L), capacitor 86b is disconnected, the switch-ON time $T_{S\_ON}$ is reduced to 90% of its value in DCM, and therefore given by equation (5):

$$T_{S\_ON} = 0.9 * \frac{C_T * V_{REF} * R_T}{(V_{IN} - V_{LOAD})} \quad (5)$$

Solving for the value $I_T$ in terms of equation (3), (4) and (5) yields equation (6):

$$I_T = \frac{(V_{IN} - V_{LOAD})}{L} * T_T \quad (6)$$
$$= \frac{(V_{IN} - V_{LOAD})}{L} * \frac{C_T * V_{REF} * R_T}{(V_{IN} - V_{LOAD})}$$
$$= \frac{C_T * V_{REF} * R_T}{L}$$

Thus, equation (5) demonstrates that the value $I_T$, representing the value of $I_T$ the valley current $I_{Lvalley}$ to peak current $I_{Lpeak}$, is independent of $V_{IN}$ 1 and $V_{LOAD}$ 8. By setting:

$$C_T * V_{REF} * R_T = L_{NOMINAL} * I_{T\ NOMINAL} = \text{CONSTANT} \quad (7)$$

where $L_{NOMINAL}$ is the nominal value of L and $I_{T\ NOMINAL}$ is the nominal value of $I_T$, the actual value of value $I_T$ (i.e. the desired value of $I_{T\_DESIRED}$) can be set by the user/operator by adjusting the value of the external (to the integrated circuit) inductor L 4 by equation (8):

$$L = \frac{(I_{T\_NOMINAL} * L_{NOMINAL})}{I_{T\_DESIRED}} = \frac{\text{CONSTANT}}{I_{T\_DESIRED}} \quad (8)$$

As discussed above, proper operation of the controller 41 in FIG. 2 requires signal $V_E$ 77 output by the comparator 71 changes between logic H and logic L at the same common value of input voltage to comparator 71 and amplifier 72 which causes the current from error amplifier 72 to the loop filter 15 to change polarity, (i.e., from source to sink). When comparator 71 and error amplifier 72 are implemented as separate functional blocks, there are unavoidable differences in the values of the input offset voltage in the two functional blocks. Signal $V_E$ 77 output from the comparator 71 controls the operation of the switch SW 3 in DCM, but the signal from the error amplifier 72 through the loop filter 15 to the comparator 76 controls the transition between DCM and CCM operation. Thus, a difference in the input offset voltages of the comparator 71 and the error amplifier 72 can cause changes in the regulated value of $V_{LOAD}$ at the transition between DCM and CCM. Therefore, the difference between the input offset values should be minimized so as to reduce such voltage variation. This is accomplished in accordance with the present invention by having a single common input stage with two separate current outputs for the error amplifier 72; one driving the loop filter 15 and the other driving the comparator 71 and output signal $V_E$ 77, as shown in FIG. 4.

Figure 4:
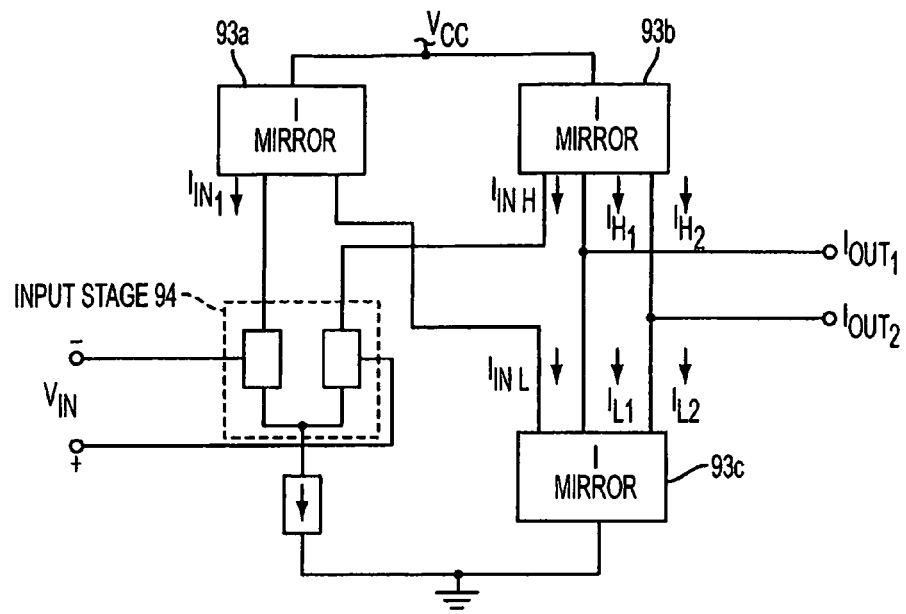
FIG. 4 illustrates an exemplary error amplifier utilized with the present invention.

FIG. 4 illustrates a dual error amplifier for use in accordance with a second embodiment of the present invention. Referring to FIG. 4, the difference in input referred offset voltage between $I_{OUT}$ 1 and $I_{OUT}$ 2 is determined by the matching of current mirror outputs $I_{L1}$ and $I_{L2}$, and $I_{H1}$ and $I_{H2}$ of current mirrors 93a, 93b and 93c, and the difference in offset referenced to the input is further improved by the transconductance gain of the input stage 94. It is noted that the input stage can be, for example, a bipolar transistor differential pair for best offset, but could also be a MOS pair. Thus, utilizing such an error amplifier in the exemplary embodiment shown in FIG. 2 improves performance of the switching regulator by suppressing undesired change of the output voltage $V_{LOAD}$ as a function of the load current $I_{LOAD}$ 7 when the transition between DCM and CCM occurs, while also simplifying and reducing the area required for implementation in an integrated circuit.

Figure 5:
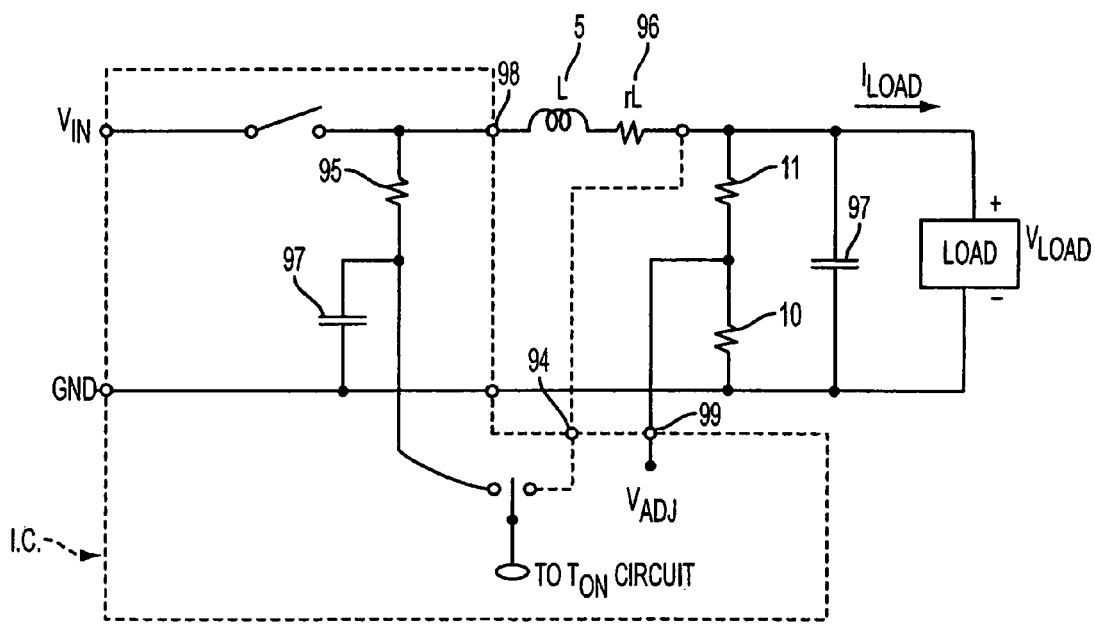
FIG. 5 illustrates an exemplary circuit diagram for minimizing pin count on the package of the integrated circuit of the present invention.

FIG. 5 depicts an exemplary circuit diagram for minimizing pin count on the package of the integrated circuit of the present invention. Referring to FIG. 5, in order to implement the function shown in FIG. 2 in an integrated circuit, the number of I/O pin connections required between the integrated circuit and the external components, for example, in the case of an adjustable regulator having external user selectable resistor $R_2$ 10 and $R_1$ 11, must include at least two pins in order to provide both $V_{LOAD}$ 8 and $V_{ADJ}$ 9 in the integrated circuit. However, the difference between the average value of the voltage at the inductor input 25 and $V_{LOAD}$ is equal to the load current $I_{LOAD}$ 7 times the DC resistance of the inductor 5, which is inherently a small value in a high efficiency regulator. Thus, the average value of inductor input voltage can replace $V_{LOAD}$ in the $T_{ON}$ timer circuit shown in FIG. 6 with only a slight increase in variation of switch-ON time $T_{S\_ON}$ with variation in load current $I_{LOAD}$ 7. By replacing the $V_{LOAD}$ signal at I/O pin 94 with the average or low-pass filtered value of the inductor input voltage that already has an I/O pin 98, the I/O pin 94 of $V_{LOAD}$ can be eliminated at the cost of only an on-chip R-C filter comprising, for example, resistance 95 and capacitor 97, as shown in FIG. 5.

As noted above, the present invention provides significant advantages over the prior art devices. One such advantage of the present invention is that it provides a current mode switching regulator with the capability of operating at switch ON duty cycles of up to 100% that can be implemented without the use of slope compensation by utilizing a predetermined value of switch ON time $T_{ON}$.

Utilizing the programmed ON time in accordance with the present invention as discussed above eliminates the need for sensing current during the (often) short high-side switch ON time and minimizes switching frequency variations without requiring a constant frequency clock.

Another advantage of the present invention is to provide a controller which employs an integration of error between the desired and actual values of output voltage in order to improve the regulation accuracy of the output voltage beyond that provided by controllers having only proportional error control.

Another advantage is that the controller of the present invention operates in both the discontinuous inductor current mode "DCM" at small values of load current to thereby provide superior light load efficiency, and the continuous inductor current mode "CCM" at large values of load current for the purpose of reducing the value of ripple current in the inductor and output capacitor (and therefore the ripple voltage at voltage output) as well as providing superior efficiency at heavy loads.

Yet another advantage is the automatic transition realized between DCM and CCM and the use of current mode control, which provides rejection of both load current and input voltage changes in the output voltage as well as minimizes changes in transient response time as a function of load current operating point.

Another advantage is that the circuit of the present invention employs continuous direct monitoring of the error signal before the loop filter without a sampling clock, which eliminates the delays due to filter slew rate and clock period.

The present invention also provides reliable and consistent automatic mode change between continuous current mode (CCM) and discontinuous current mode (DCM) without a change in output voltage or a need to sense load current.

Another advantage of the present invention is that it provides for improved efficiency (especially in DCM mode) by selectively powering off functions not utilized at the given time without placing the entire system in a "sleep mode" (which typically has an associated increase in output ripple voltage and increased delay in the transient response).

Yet another advantage of the present invention is that it provides a much smaller change in switching period between DCM and CCM when compared to prior art regulators that utilize a "sleep and burst" mode operation in DCM.

Another advantage of the design of the present invention is that the variation in the switching frequency in CCM is only slightly different when compared to a device being directly clocked, and has a nominal value that is substantially independent of $V_{IN}-V_{OUT}$ and $I_{LOAD}$. In other words, the present invention causes the steady state CCM switching frequency to be substantially constant in the presence of supply voltage and load variations without the use of a clock (which would require slope compensation).

While specific embodiments of, and examples for, the invention are described herein for illustrative purposes, various equivalent modifications are possible within the scope of the invention, as those skilled in the relevant art will recognize. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A power supply switching regulator comprising:
a common terminal;
an input terminal for supplying a direct current input;
an output terminal;
a recirculation diode having a first terminal connected to the common terminal;
an inductor having a first terminal connected to a second terminal of the recirculation diode and a second terminal connected to the output terminal;
a capacitor having a first terminal connected to the output terminal and a second terminal connected to the common terminal;
a switch connected between the input terminal and the first terminal of the inductor, said switch operable for switching between an ON state in which said direct current input is coupled to said inductor, and an OFF state in which said direct current input is isolated from said inductor; and
a controller coupled to said switch and operable for controlling the amount of time said switch is in said ON state and the said OFF state such that the duration of time said switch is in said ON state is inversely proportional to the difference between the voltage at the input terminal and the voltage at the output terminal, and
an amplifier having an inverting input coupled to said second terminal of said recirculation diode; a non-inverting input coupled to a first terminal of an offset voltage source; and an output coupled to said recirculation diode and to said controller, said first terminal of said recirculation diode being coupled to a second terminal of said offset voltage source.

2. The power supply switching regulator of claim 1, wherein said switching regulator allows for said switch to be in said ON state for duty cycles up to 100%.

3. The power supply switching regulator of claim 1, wherein said recirculation diode comprises a transistor and a body diode, said transistor having a drain terminal coupled to a cathode terminal of said body diode and a source terminal coupled an anode terminal of said body diode.

4. The power supply switching regulator of claim 1, wherein said controller includes a timer circuit operable for controlling the period said switch is in said ON state.

5. The power supply switching regulator of claim 1, wherein said controller operates to power OFF inactive components of said power supply switching regulator during normal operation of said power supply switching regulator.

6. A power supply switching regulator comprising:
a common terminal;
an input terminal for supplying a direct current input;
an output terminal;
a recirculation diode having a first terminal connected to the common terminal;
an inductor having a first terminal connected to a second terminal of the recirculation diode and a second terminal connected to the output terminal;
a capacitor having a first terminal connected to the output terminal and a second terminal connected to the common terminal;
a switch connected between the input terminal and the first terminal of the inductor, said switch operable for switching between an ON state in which said direct current input is coupled to said inductor, and an OFF state in which said direct current input is isolated from said inductor;

a controller coupled to said switch and operable for controlling the amount of time said switch is in said ON state and the said OFF state such that the duration of time said switch is in said ON state is inversely proportional to the difference between the voltage at the input terminal and the voltage at the output terminal; said controller including a timer circuit operable for controlling the period said switch is in said ON state;

wherein said power supply switching regulator is operable in both a discontinuous inductor current mode and a continuous inductor current mode, and said timer circuit is operable for reducing the amount of time said switch is in the ON state when operating in continuous inductor current mode relative to the amount of time said switch is in the ON state when operating in the discontinuous inductor current mode, at the same values of input voltage, output voltage and load.

7. The power supply switching regulator of claim 6, wherein said timing circuit reduces the period of the ON state of the switch to approximately ninety percent of that when said switching regulator is operating in the continuous inductor current mode relative to when said switching regulator is operating at the same conditions but in discontinuous inductor current mode.

8. The power supply switching regulator of claim 6, wherein the transition between operating in the discontinuous inductor current mode and the continuous inductor current mode, and the transition between operating in the continuous inductor current mode and the discontinuous inductor current mode is performed automatically.

9. A power supply switching regulator comprising:
a common terminal;
an input terminal for supplying a direct current input;
an output terminal;
a recirculation diode having a first terminal connected to the common terminal;
an inductor having a first terminal connected to a second terminal of the recirculation diode and a second terminal connected to the output terminal;
a capacitor having a first terminal connected to the output terminal and a second terminal connected to the common terminal;
a switch connected between the input terminal and the first terminal of the inductor, said switch operable for switching between an ON state in which said direct current input is coupled to said inductor, and an OFF state in which said direct current input is isolated from said inductor; and
a controller coupled to said switch and operable for controlling the amount of time said switch is in said ON state and the said OFF state such that the duration of time said switch is in said ON state is inversely proportional to the difference between the voltage at the input terminal and the voltage at the output terminal, wherein said controller comprises a loop filter for generating an output voltage, said controller operative for transitioning between a continuous inductor current mode and a discontinuous inductor current mode in accordance with an output voltage level of said loop filter.

10. The power supply switching regulator of claim 9, wherein said controller further comprises an error amplifier having a first input for receiving a signal representing the output voltage level of said power supply switching regulator and a second input for receiving a reference voltage signal, said error amplifier generating an output signal which is coupled to an input of said loop filter.

11. The power supply switching regulator of claim 10, wherein said error amplifier is operable when said power switching regulator is operating in a discontinuous inductor current mode and when said power switching regulator is operating in a continuous inductor current mode.

12. The power supply switching regulator of claim 10, wherein said controller further comprises a comparator having a first input for receiving said signal representing the output voltage level of said power supply switching regulator and a second input for receiving said reference voltage signal, said comparator generating a signal operative for transitioning said switch to said ON state when said signal representing the output voltage level of said power supply falls below said reference voltage signal.

13. The power supply switching regulator of claim 12, wherein continuous direct real time monitoring of an output signal of said comparator is performed so as to reduce effects of an error amplifier filter slew rate and clock period on a transient response of said regulator.

14. The power supply switching regulator of claim 12, wherein said error amplifier and said comparator are formed utilizing a dual output error amplifier.

15. The power supply switching regulator of claim 14, wherein said dual output error amplifier has a first output signal and a second output signal, said first output signal being utilized for generating said output signal coupled to said input of said loop filter, and said second output signal being utilized for driving said comparator, and wherein said first output signal has a voltage response which is modified by said loop filter so as to alter the slew rate of the first output signal.

16. A power supply switching regulator comprising:
a common terminal;
an input terminal for supplying a direct current input;
an output terminal;
a recirculation diode having a first terminal connected to the common terminal;
an inductor having a first terminal connected to a second terminal of the recirculation diode and a second terminal connected to the output terminal;
a capacitor having a first terminal connected to the output terminal and a second terminal connected to the common terminal;
a switch connected between the input terminal and the first terminal of the inductor, said switch operable for switching between an ON state in which said direct current input is coupled to said inductor, and an OFF state in which said direct current input is isolated from said inductor; and
a controller coupled to said switch and operable for controlling the amount of time said switch is in said ON state and the said OFF state such that the duration of time said switch is in said ON state is inversely proportional to the difference between the voltage at the input terminal and the voltage at the output terminal, wherein a signal representing the voltage at the output terminal of said power supply switching regulator is generated by averaging an input voltage to said inductor.

* * * * *